United States Patent
Birzer et al.

(10) Patent No.: US 6,757,568 B2
(45) Date of Patent: Jun. 29, 2004

(54) AUTOMATION SYSTEM FOR MERGING AUTOMATION COMPONENTS

(75) Inventors: Johannes Birzer, Stulln (DE); Martin Kiesel, Poxdorf (DE); Georg Trummer, Erlangen (DE); Peter Wagner, Hersbruck (DE)

(73) Assignee: Siemens Aktiengesellschaft, Munich (DE)

(*) Notice: Subject to any disclaimer, the term of this patent is extended or adjusted under 35 U.S.C. 154(b) by 116 days.

(21) Appl. No.: 09/886,020

(22) Filed: Jun. 21, 2001

(65) Prior Publication Data

US 2002/0082720 A1 Jun. 27, 2002

(30) Foreign Application Priority Data

Dec. 27, 2000 (DE) .......................................... 100 65 401

(51) Int. Cl.[7] .............................................. G05B 11/01
(52) U.S. Cl. ............................. 700/18; 700/19; 700/20; 700/56; 700/61; 700/96
(58) Field of Search ........................... 700/1, 9, 18, 19, 700/20, 56, 83, 96, 61

(56) References Cited

U.S. PATENT DOCUMENTS

| | | | | | |
|---|---|---|---|---|---|
| 5,485,620 A | * | 1/1996 | Sadre et al. | ................ | 717/162 |
| 5,977,739 A | * | 11/1999 | Ohsawa | ..................... | 318/685 |
| 6,011,374 A | * | 1/2000 | Ulbrich | ..................... | 318/569 |
| 6,144,889 A | * | 11/2000 | Kammler et al. | ............. | 700/86 |
| 6,168,053 B1 | * | 1/2001 | Keough | ..................... | 222/590 |
| 6,539,268 B1 | * | 3/2003 | Wucherer et al. | ............. | 700/61 |
| 6,574,520 B1 | * | 6/2003 | Liu et al. | ..................... | 700/96 |
| 6,594,541 B1 | * | 7/2003 | Wucherer et al. | ............ | 700/159 |
| 6,653,810 B2 | * | 11/2003 | Lo | ............................. | 318/569 |
| 6,668,205 B1 | * | 12/2003 | Ueno | ........................ | 700/96 |
| 2001/0034559 A1 | * | 10/2001 | Brown et al. | ................. | 700/17 |

FOREIGN PATENT DOCUMENTS

| | | | | | |
|---|---|---|---|---|---|
| JP | 01185103 A | * | 7/1989 | .......... | B60L/15/20 |
| WO | 00/00059 | | 1/2000 | | |

OTHER PUBLICATIONS

Lenze IEC 1131, Servo PLC.

* cited by examiner

Primary Examiner—Ramesh Patel
Assistant Examiner—Crystal J Barnes
(74) Attorney, Agent, or Firm—Baker Botts L.L.P.

(57) ABSTRACT

The present invention relates to an automation system in which a functionality of at least two components from a programmable logic controller which can be regulated as required and/or from a drive controller which regulates rotation speed and/or position, and/or from a motion controller which regulates complex operations is integrated. The integrated controller constructed in this way can additionally have a single processor equipped with every functionality, further specific interfaces incorporation of engineering system and runtime system (RS) into the integrated controller, a web server functionality, a project data configuration using a single control action and an integrated, extensive data management unit (DM).

12 Claims, 14 Drawing Sheets

```
 8  CONST
 9   LIMIT    := 7;
10  END_CONST
11
12  BEGIN
13  IF value <= 181 THEN
14      SQUARE   := value * value;   // Calculation of function value
15  ELSE
16      SQUARE   := 32_767;   // If exceeded, set maximum value
17  END_IF;
18
19  PositionAxis(axis:= Transport axis   , position:= 235, velocity:= 900);
20  PositionAxis(axis:= Belt axis        , position:= 500, velocity:= 400);
21  PositionAxis(axis:= Transverse axis  axis position:= 100, velocity:= 1000);
22
```

FIG 8

AUTOMATION SYSTEM FOR MERGING AUTOMATION COMPONENTS

BACKGROUND OF THE INVENTION

The invention relates to an automation system in which the functionality of at least two components from a programmable logic controller which can be regulated as required, and/or from a drive controller which regulates rotation speed and/or position, and/or from a motion controller which regulates complex operations is integrated.

Such automation systems are known from the document "Lenze IEC 1131 inside", for example. As disclosed, the manner of operation of a typical programmable logic controller is quite usual in industrial automation, and the functionality of a drive controller carrying out operations to regulate position and rotation speed are known to be combined in an integrated system. Pre-configured drive functions are incorporated into the program environment by more or less rigid functional modules. However, the manner in which the final runtime version for operating such a system is actually provided within the context of an engineering system is not reported in any more detail in this document. In addition, this document also contains no suggestion of incorporating highly complex controllers into such a system, such as those which form the basis of numerical controllers.

In addition, Patent Application PCT/DE00/00059 discloses providing a system for a universal motion controller which contains both the engineering system and the runtime system. Nevertheless, nothing is said about the resulting hardware.

Accordingly, it is an object of the present invention to design an automation system of the type mentioned initially such that it can be used for universal purposes, with the necessary hardware being able to be formed by extensive integrated merging of individual components for automation.

SUMMARY OF INVENTION

This object is achieved by providing an integrated controller and integrated engineering system with integrated programmability and an integrated runtime system having associated source code for user programs and having a common data management unit, the data management unit being able to be integrated in the engineering system and/or in the integrated controller.

On a technical level, the merging of the individual automation components is represented not only by interconnection of individual hardware components and of an integrated programming and control view for the user, but rather there is also continuous integration of the respective runtime systems with all the interfaces and functions. The runtime system of the integrated controller is able to control or to regulate both cyclic requests, as usually executed by a programmable logic controller, and sequential, in some cases extremely complex, operations which are commonly performed by a numerical controller.

The integrated merging of the automation component both at the hardware level and at the software level produces extensive flexibility in the programmability. Since a total user source code is loaded into an integrated engineering system for the integrated controller, this integrated engineering workbench has all the software tools for the programmable logic controller capable of regulation, for the drive controller which regulates rotation speed and/or position, and for the motion controller which regulates complex operations. These include programming, debugger and startup tools, and also the option of changing between different programming languages.

During the engineering phase, it is normal to use a programming language convention which is customary for the individual automation component in order to program the control and/or regulation and/or motion request to be made. The integrated controller provides the option of freely selecting the language convention according to the main emphasis of the application. First, by way of example, the user has the following options available:

1) Structured Text:
   Programming language convention for an experienced system and application programmer.
2) Motion Control Chart:
   Programming language convention for a solution approach with a machine running orientation.
3) Function-Control Chart:
   Programming language convention for a programming view with a data flow orientation.
4) Position-Time Chart:
   Programming language convention for a programming view with a position-time chart orientation.

These different programming functions can be called by one another and can be mixed as desired, allowing the user to be provided with an ideal programming view and programming language environment on the basis of a task section.

The homogenous engineering and runtime system of the integrated controller also provides the user with convenient programming for exceptional states and error routines for the whole automation component. In commercially available drive controllers regulating rotation speed and/or position, parameterizable exceptional state reactions are stipulated in a defined scheme if need be. An integrated controller can now be used to stipulate programmable exceptional state reactions, precisely matched to one another, for the whole component in optimum fashion.

A preferred embodiment of the present invention is characterized in that technological objects are integrated for the integrated controller. The technological objects can comprise both rotation-speed, positioning and synchronism axes and cam, transmitter, measurement and cam plate functions. The previously rigid hardware interfaces can be resolved and can be implemented using the options of the technological objects individually, on an application basis, flexibly and in fine steps. In an integrated program philosophy, these objects can be instantiated, freely combined, and addressed in an object oriented programming mode. Particularly the option of being able to address the technological objects in fine steps represents the entire functionality of an automation component much more extensively than if only a limited command set is provided using rigid functional modules.

Another preferred embodiment of the present invention is characterized in that the integrated controller has a single processor which is provided for executing every functionality. Such a single-processor system is technically relatively simple to implement and, in consideration of the high complexity of processors available on the market today, in the meantime is sufficiently powerful for the application. That the integrated controller has an interface for a human/machine interface makes it possible, in order to increase the convenience of the display and input functions of the automation system, to provide the integrated controller with a technical measure in this regard.

Yet another preferred embodiment of the present invention is that the functionality for a human/machine interface is additionally stored in the integrated controller. This provides the opportunity to use application-specific human/machine interface devices and/or standard viewers and browsers which are independent of technology and application in order to control and observe a machine. This can include both the storage of display surfaces, graphics and help pages in the device's data memory and the ability to use all common data interchange formats of standard browsers and viewers to communicate with other devices.

The fact that the integrated controller is equipped with an integrated web server functionality allows the integrated controller's dataset, including associated program data, to be requested and updated over a network connection in a relatively simple manner. The web server functionality can be used to address and retrieve functions and data of the integrated controller over the Internet or an intranet.

A further preferred embodiment of the present invention is characterized in that respective forms of technology specific to sectors of industry are provided for the functionality of the programmable logic controller and/or drive controller and/or motion controller. This allows the system to be optimally matched to specific industrial technologies, e.g. printing technology, textile technology, packaging technology etc. In this context, the user can profit from the wealth of technological experience from the manufacturer of the technological packages which is implied in the integrated controller.

Incorporating the engineering system in the integrated controller advantageously makes it possible to use identical hardware resources. Another particular advantage of the present invention is that the common data management unit is able to use an initial data version to generate a respectively current data version continuously from documented dataset changes made in a respectively arbitrary manner, particularly from user and/or system data changes. In an automation system which has properties of such complexity and comprises both the functionality of customary programmable logic controllers and of drive controllers which regulate rotation speed and/or position, and additionally those of motion controllers, the addition of the motion controller, in particular, which is today usually provided by a numerical controller, requires an immense dataset. Only clever data management on the basis of the proposed configuration of the invention makes it possible to perpetuate the respectively current data version within a limited memory volume. In this context, precisely such an incremental method also quite decisively simplifies updating by means of Internet or intranet communication.

In such a system, it is additionally possible for previous data versions to be restored by feeding back the documented dataset changes. This also comprises an important characteristic of the present invention, since it allows a service technician, for example, to fall back on previous data versions if irregularities arise in the system which is running.

Yet another preferred embodiment of the present invention consists in using a single control action to load a cohesive project data configuration into the integrated controller, said configuration being able to contain at least parameterizing data and/or user program data and/or hardware configurations and/or bus configurations. This option provides the user with a time saving way of transferring associated project data from the engineering system or from a data server, for example, and injecting them into the integrated component, using a single, easily executed control action. Laborious, time consuming and error-prone individual configurations are eliminated. The user thus has, with minimum operating complexity, a configuration tool available which provides him with a considerable time saving, particularly in the case of similar configurations. It is also conceivable for the single control action to be used to execute a macro or a script which initiates a series of automatic configuration and parameterization operations.

An advantageous method for operating an automation system in accordance with the invention is characterized in that the engineering and runtime system is produced by the following steps:

a) the runtime properties of the automation components involved are considered;

b) on the basis of the runtime properties, all the control functionalities are homogeneously integrated into the engineering system and/or into the runtime system of the integrated controller; and c) the user is provided with programmability for the functionality of the integrated controller. In this context, in a method with a plurality of steps, the level of knowledge from the runtime properties of the integrated controllers is first introduced, and nothing but the overall programmability of the integrated controller is provided in the resulting user interface in a manner which is advantageous for the user.

An exemplary embodiment of the present invention is illustrated in the drawings and is explained in detail below:

DRAWINGS

FIG. 8 shows a screenshot of a program editor in the integrated controller in a structured text environment.

DETAILED DESCRIPTION OF THE INVENTION

Figure 1:
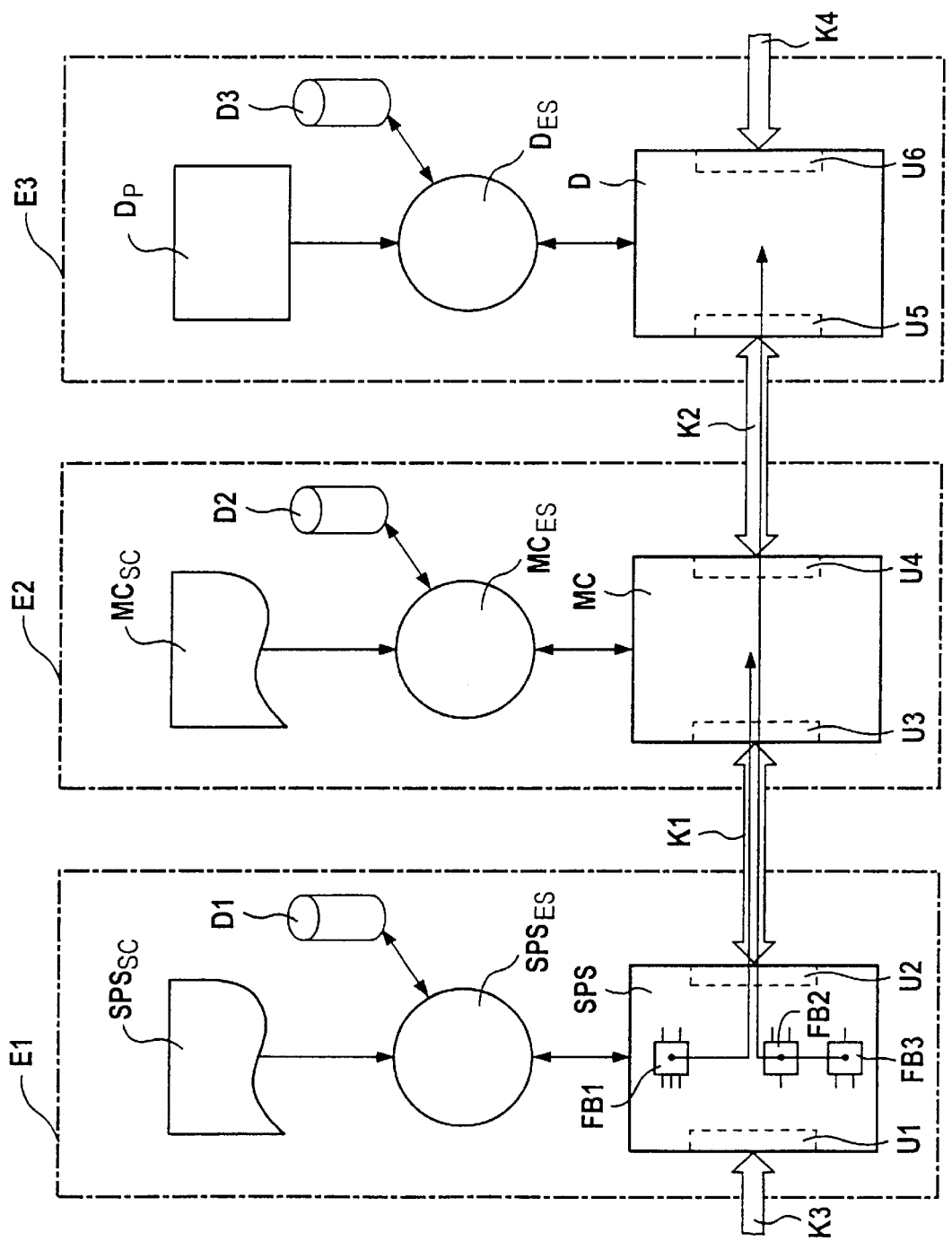
FIG. 1 shows the schematic design and the interconnection of automation components.

The illustration shown in FIG. 1 shows, schematically, the design and interconnection of different commercially available automation components. This Figure shows the interconnection of a programmable logic controller SPS and a motion controller MC, which regulates complex operations, and also shows a drive controller D, which regulates rotation speed and/or position. These devices each form independent units E1, E2 and E3 which are each identified in FIG. 1 by a rectangle shown in dashes. Besides the hardware, these units E1, E2 and E3 also contain software components which will be discussed further below.

During the installation planning and/or startup phase, unit-related program source codes $SPS_{SC}$, $MC_{SC}$ or parameterization data $D_P$ are entered. The respective program source code, indicated by a curved input symbol, or the parameterization data record, indicated by a rectangle, is transferred to respectively associated engineering systems $SPS_{ES}$, $MC_{ES}$ and $D_{ES}$ (symbolized by circles). This is shown in FIG. 1 by a respective arrow starting from the respective source code or parameterization data record to an associated engineering system. Typically, illustrative programming languages which apply are the language conventions stipulated in IEC 1131, for the programmable logic controller SPS, and the language conventions stipulated in DIN 66025, for the motion controller MC regulating complex operations.

The individual engineering system has a respective data memory D1, D2 or D3 associated with it, in which a wide variety of data can be stored and retrieved. The data memories D1, D2 and D3 are indicated by drum-like symbols. The bi-directional flow of data produced between the engineering systems $SPS_{ES}$, $MC_{ES}$ and $D_{ES}$ and the data memories D1, D2 and D3 is symbolized in FIG. 1 by a double-headed arrow between the respectively associated components.

The engineering system $SPS_{ES}$, $MC_{ES}$ or $D_{ES}$ generates a runtime system for the associated automation component. During the processing or preparation phase, the engineering system $SPS_{ES}$, $MC_{ES}$ or $D_{ES}$ may require data from the respective component, i.e. the programmable logic controller SPS, the motion controller MC or the drive controller D. For this reason, FIG. 1 shows the connection between the engineering systems $SPS_{ES}$, $MC_{ES}$ or $D_{ES}$ and the automation components (SPS, MC and D) using a respective double-headed arrow, in order to indicate that a bi-directional flow of data may be involved here.

To operate a technical device which contains the individual automation components, programmable logic controller SPS, motion controller MC and drive controller D, it is necessary to adjust or tune these components to one another. To enable this communication, the individual components have interfaces U1 to U6 which allow them to communicate externally. In this case, the interfaces U1 to U6 are indicated as integral components (indicated in dashes) of the programmable logic controller SPS, the motion controller MC, and the drive controller D.

In the illustration shown in FIG. 1, the programmable logic controller SPS and the motion controller MC are connected via a data channel K1 (symbolized by an open, wide double-headed arrow) by means of the interfaces U2 and U3, and the motion controller MC and the drive controller D are connected via a data channel K2 by means of the interfaces U4 and U5. Other connections via the interfaces U1 and U6 are conceivable using further data channels K3 and K4 and are indicated as data channels on the interfaces U1 and U6 by means of an arrow. Similarly, the individual components SPS, MC and/or D may have other, specific interfaces. The illustration of the data channels K2, K3 and K4 is similar to the illustration of the data channel K1.

The programmable logic controller SPS contains predefined functional modules FB1–FB3 which can be called from the user programs. FIG. 1 shows only the functional modules FB1–FB3 for reasons of clarity, but further functional modules (not shown) maybe defined in the programmable logic controller SPS. The interfaces U2–U5 and the hardware channels K1 and K2 are used for communication between the components E1–E3, which allows the programmable logic controller SPS to use the permanently defined, rigid functional modules FB1–FB3 to call functions of the motion controller MC or of the drive controller D from user programs. The access by the programmable logic controller SPS, using the functional modules FB1–FB3, to functions of the motion controller MC and/or the drive controller D is shown in FIG. 1 by an arrow which, starting from the functional modules FB1–FB3, points to the respectively associated component (MC or D) via the interfaces U2, U3 and the data channel K1, or the interfaces U2, U3 and U5 and the data channels K1 and K2. The association between the arrow lines and the functional modules FB1–FB3 is indicated on the lines by a central, solid dot in the functional modules FB1–FB3. The functional modules' flexibility for access to the motion controller MC and the drive controller D is limited by the rigid interfaces U1–U9.

Figure 2:
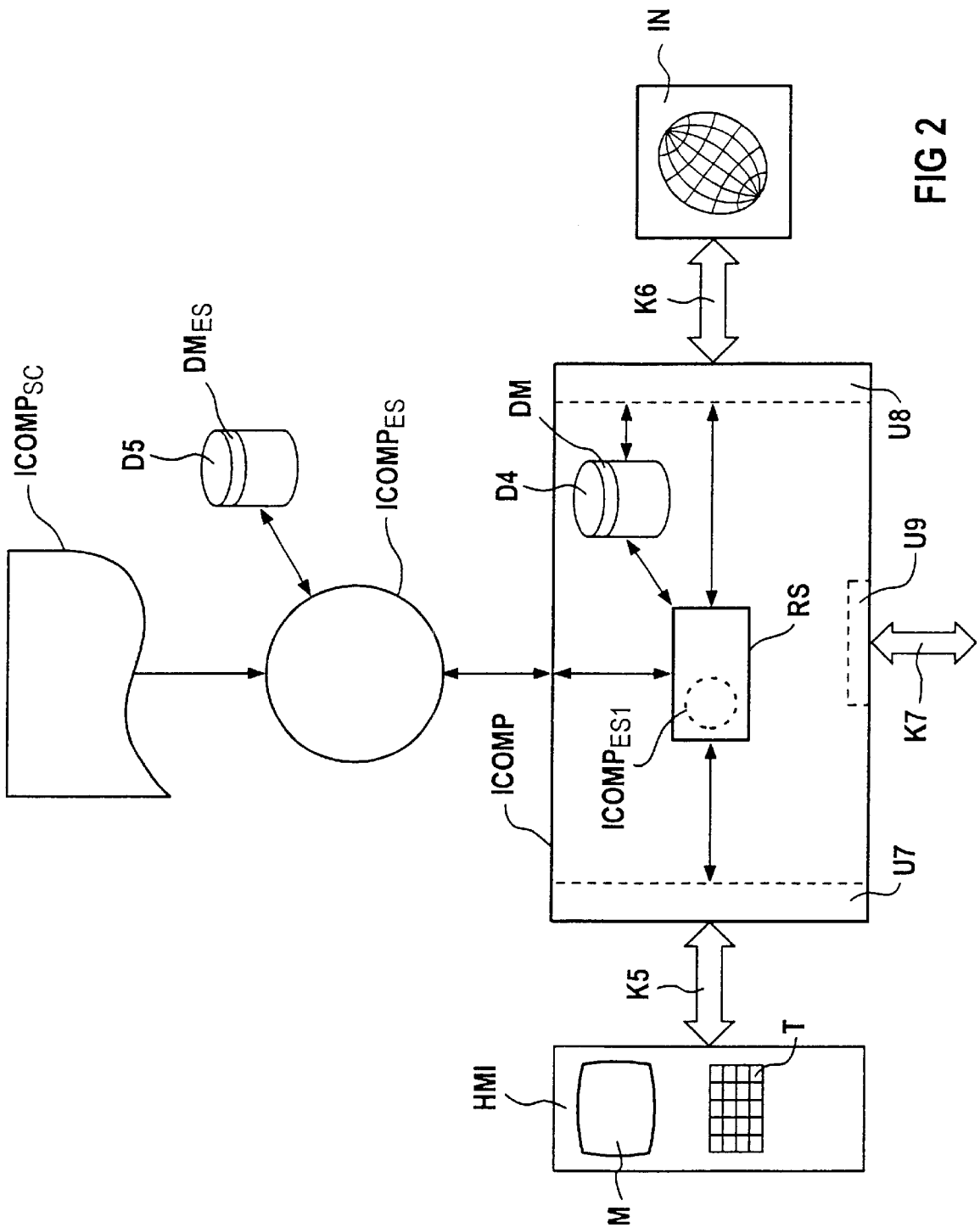
FIG. 2 shows the basic design of an integrated controller.

FIG. 2 shows an integrated controller ICOMP in the form of an integrated automation component which can contain very diverse functionality. The engineering system of the integrated controller $ICOMP_{ES}$ has an associated program source code $ICOMP_{SC}$ transferred to it. This is symbolized in FIG. 2 by an arrow link between the source code $ICOMP_{SC}$ and the engineering system $ICOMP_{ES}$. The symbols for the respective elements have been taken from FIG. 1 wherever possible.

Since the source code must be able to control all the individual components of the integrated controller ICOMP, it has an extended, homogeneously introduced functional scope. The user has the opportunity to set up and observe the system in an integrated program and programming environment.

The engineering system of the integrated controller $ICOMP_{ES}$ transfers the runtime system RS to the integrated controller ICOMP. Alternatively, the engineering system $ICOMP_{ES1}$ can also be incorporated into the runtime environment RS of the integrated controller ICOMP and can thus advantageously use identical hardware resources. In FIG. 2, this option is identified by a circle shown in dashes in the runtime environment RS.

The integrated controller ICOMP contains a common data management unit DM which can access a data memory D4 containing all the data of the integrated controller ICOMP which are required in the runtime system RS. Alternatively or in addition, the common data management unit DM may also be linked to the engineering system of the integrated controller $ICOMP_{ES}$. Such a link is shown in FIG. 2 by a data memory D5 having an associated data management unit $DM_{ES}$. In this case, the data memory D5 and the data management unit $DM_{ES}$ do not absolutely need to be placed locally within the engineering system of the integrated controller $ICOMP_{ES}$, but instead central engineering and project data storage and administration, for example using client/server functions, are also conceivable. A central data management unit for all the components may be advantageous particularly when a plurality of, possibly mutually dependent, integrated controllers ICOMP are used.

FIG. 2 shows the integrated controller ICOMP with interfaces U7 and U8 which produce a connection to external devices via the data channels K5 and K6. The interface U7 is used for bi-directional data interchange with a human/machine interface HMI. This is indicated symbolically in FIG. 2 by a monitor M and a keypad T. A user can use a human/machine interface HMI to control and observe a machine, using both application-specific human/machine interface devices and using standard viewers and browsers which are independent of technology and application. An integrated engineering system $ICOMP_{ES}$ may also be used when web server functionality exists over an Internet or intranet interface U8, so that all the engineering phases can be covered using commercially available input devices and user interfaces, e.g. browsers and viewers. The web server functionality likewise makes it possible to retrieve, by way of example, device help pages and documentation from the data memory D4 of the integrated controller ICOMP. Another option is for the data memory D4 to store a reference to an Internet page which then points centrally to a web page having respectively topical help pages, documentation pages, drivers, user discussion forums, active problem assistants etc. The manufacturer or service provider of the integrated controller can thus provide an extensive technical service which can be reached worldwide using the Internet.

In general, the access to the Internet or intranet IN (indicated by a globe) can be linked to the integrated controller ICOMP via a data channel K6. In this case, external components can set up bi-directional data traffic with the runtime system RS or can access the data memory D4 directly using a data management unit. It is also conceivable for the interfaces U7 and U8 to be merged to form a single interface which can be used to observe and control the integrated controller ICOMP.

In FIG. 2, the integrated controller ICOMP is equipped with a further is interface U9, including data channel K7, which is representative of further process interfaces. By way of example, the process interfaces may comprise fieldbus interfaces, connections for digital and/or analog drives, and analog and/or digital inputs and outputs.

Figure 3:
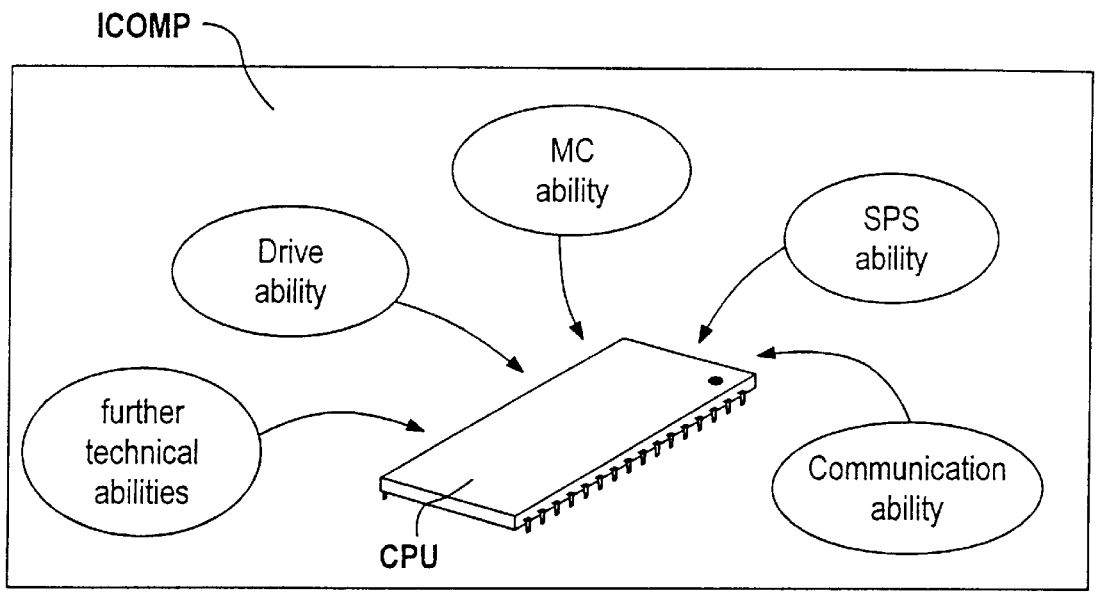
FIG. 3 shows the integrated functionality of an integrated controller on a single processor.

FIG. 3 shows the integrated controller ICOMP on the basis of specific components and functions. In this case, a single processor CPU adopts the entire functionality; in the prior art mentioned in the introduction, this was done by individual components having respective individual processors. The functionality of the processor CPU may, specifically, comprise a combination of the following individual functionalities: a communication functionality, which may include the web server functionality, shown in FIG. 3 by "communication ability", a functionality of a programmable logic controller SPS, shown in FIG. 3 by "SPS ability", a functionality for a motion controller, shown in FIG. 3 by "MC ability", a functionality for a drive controller, shown in FIG. 3 by "drive ability", and a functionality for further technological embodiments, shown in FIG. 3 by "further technical abilities".

Thus, an entire functionality of an integrated controller ICOMP can be integrated on a single processor CPU and can be provided with an optimum internal structure and extremely short connecting lines. In this embodiment, the processor is, among other things, able to access typical functions of the programmable logic controller SPS, of the drive controller D regulating rotation speed and/or position, and/or of the motion controller MC regulating complex operations.

Figure 4:
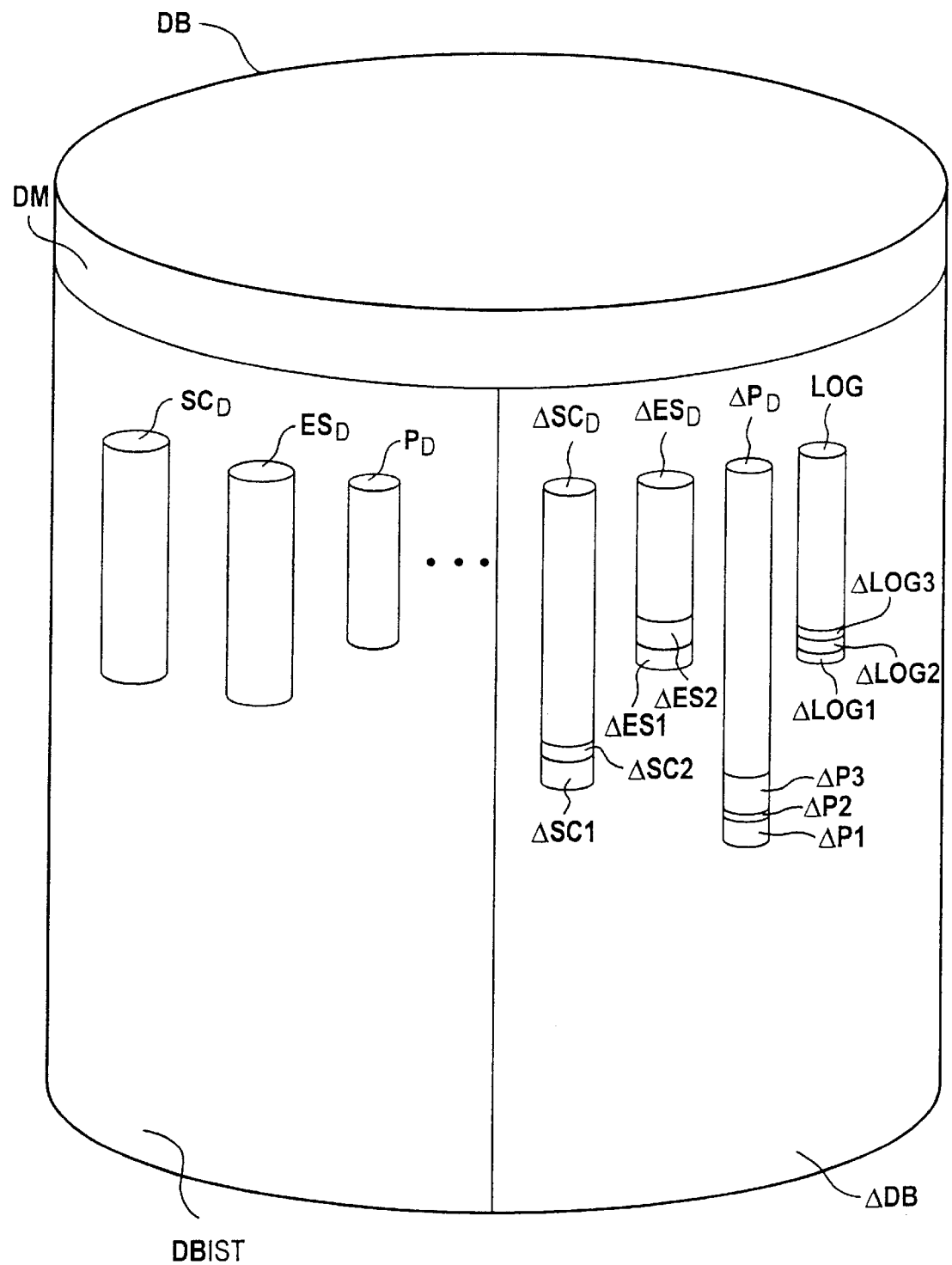
FIG. 4 shows the data management unit of an integrated controller.
Figure 6:
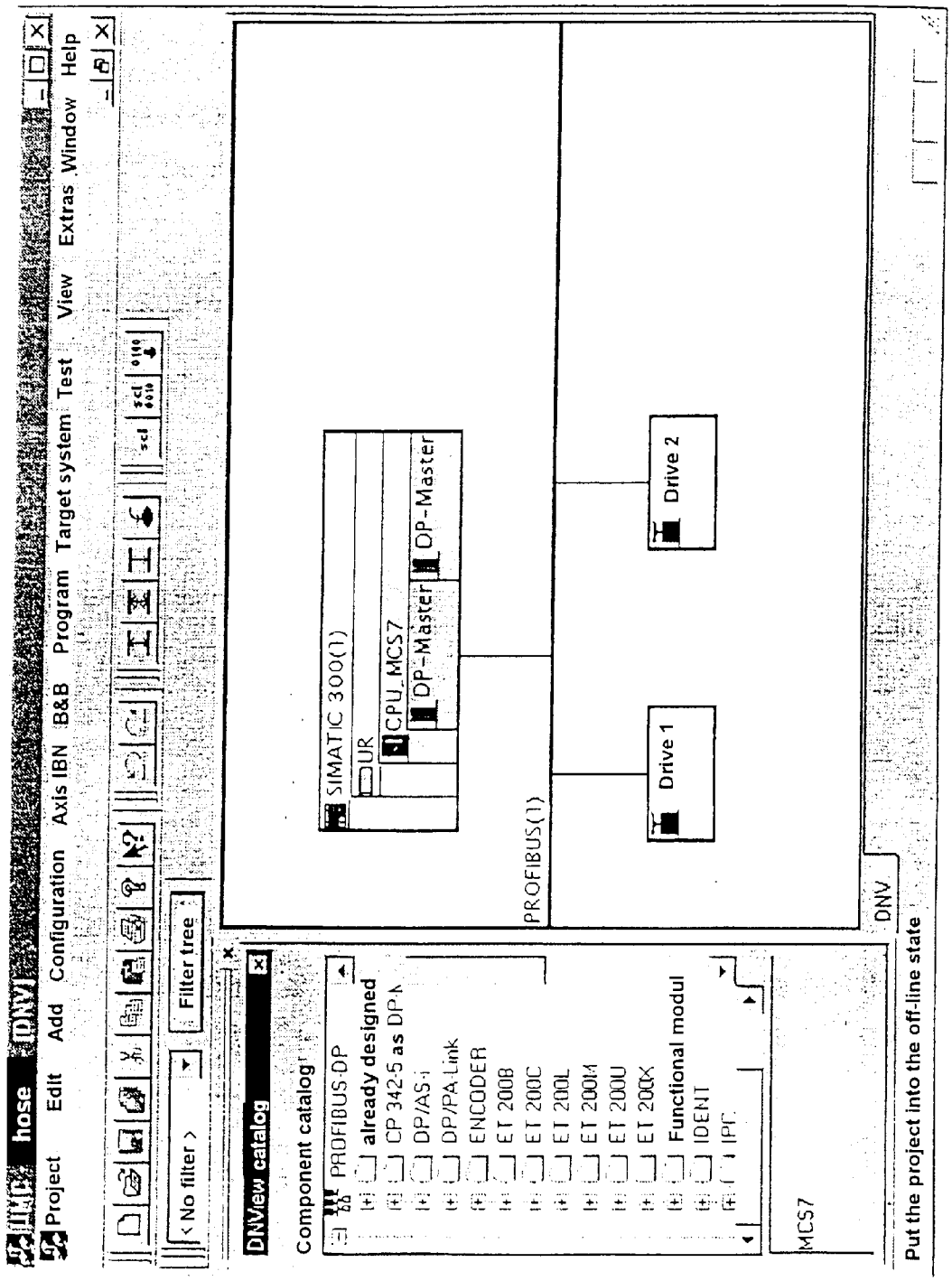
FIG. 6 shows a system configuration interface in the integrated controller in the form of a screenshot.
Figure 7:
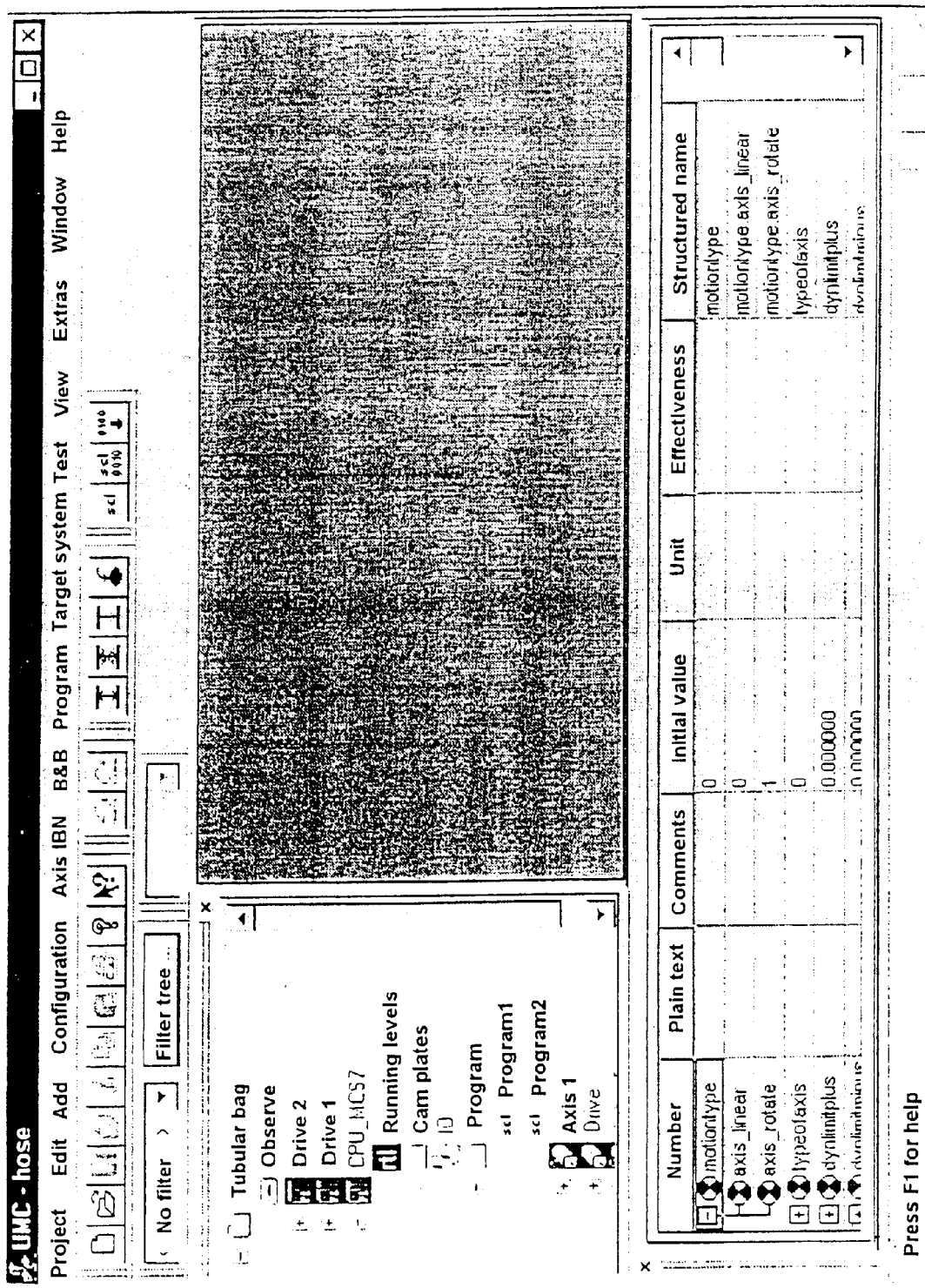
FIG. 7 shows a screenshot of a project manager in the integrated controller.
Figure 9:
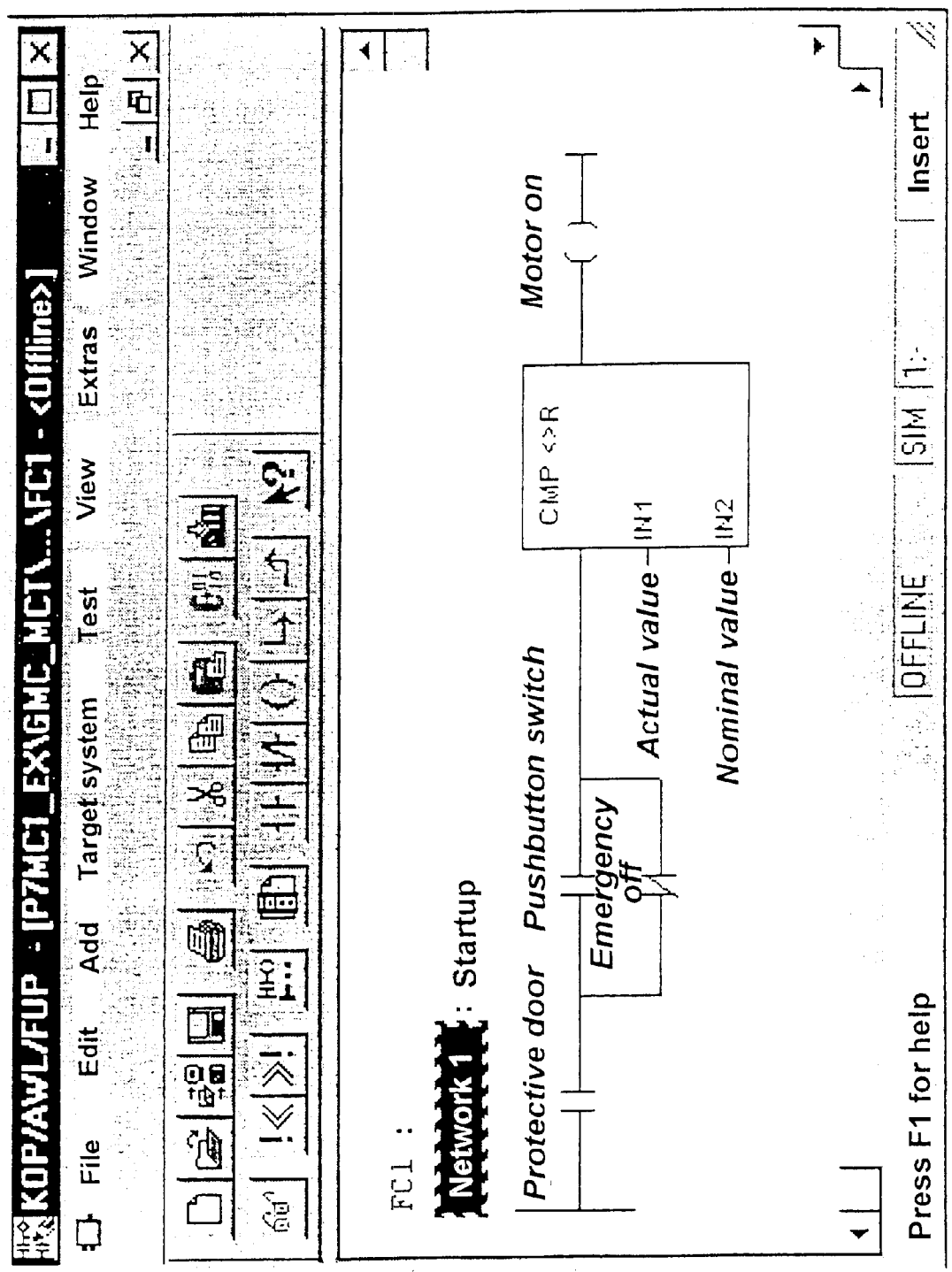
FIG. 9 shows a screenshot of a program editor in contact plan programming.
Figure 10:
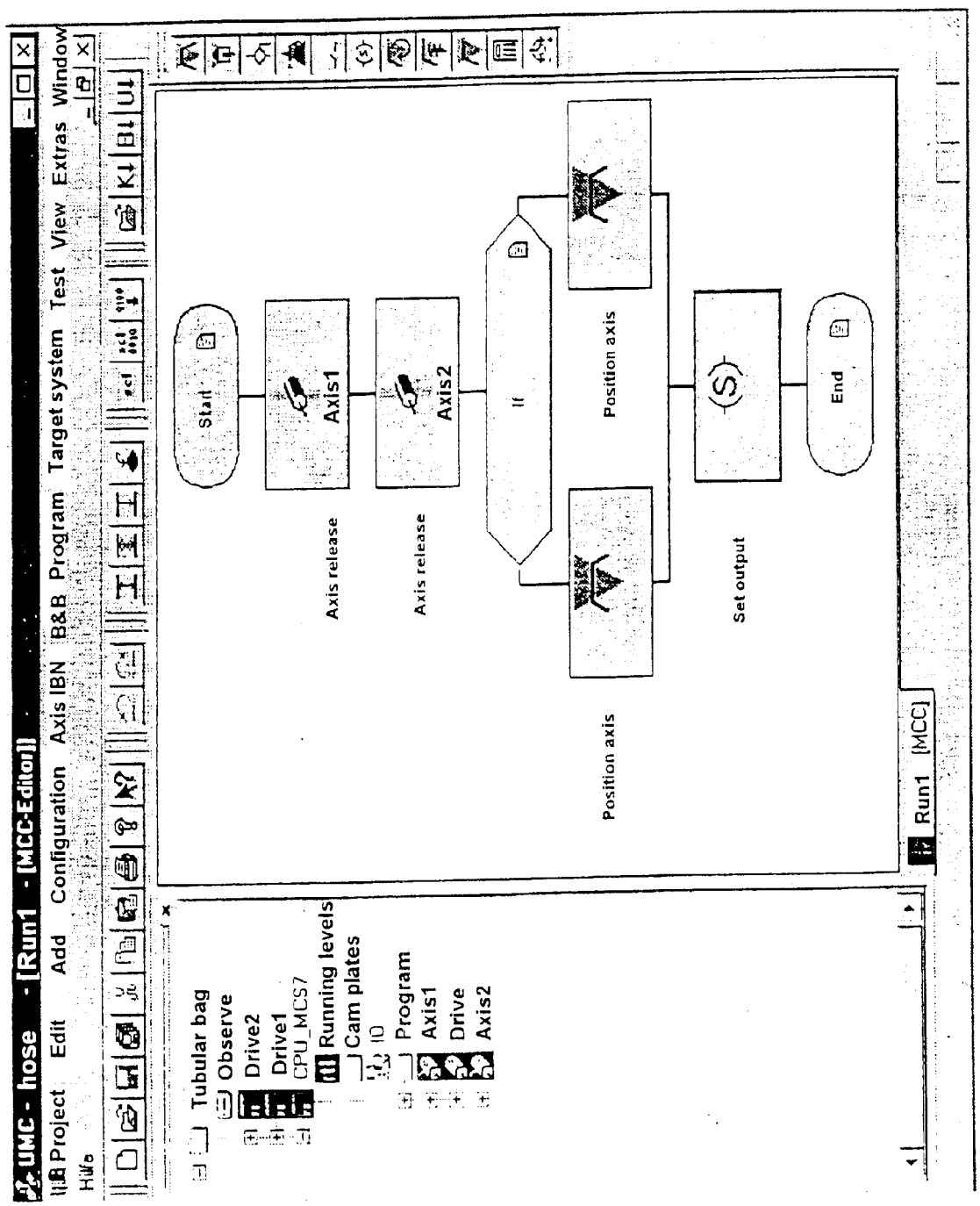
FIG. 10 shows a screenshot of a program editor in the integrated controller in a motion control chart environment.
Figure 11:
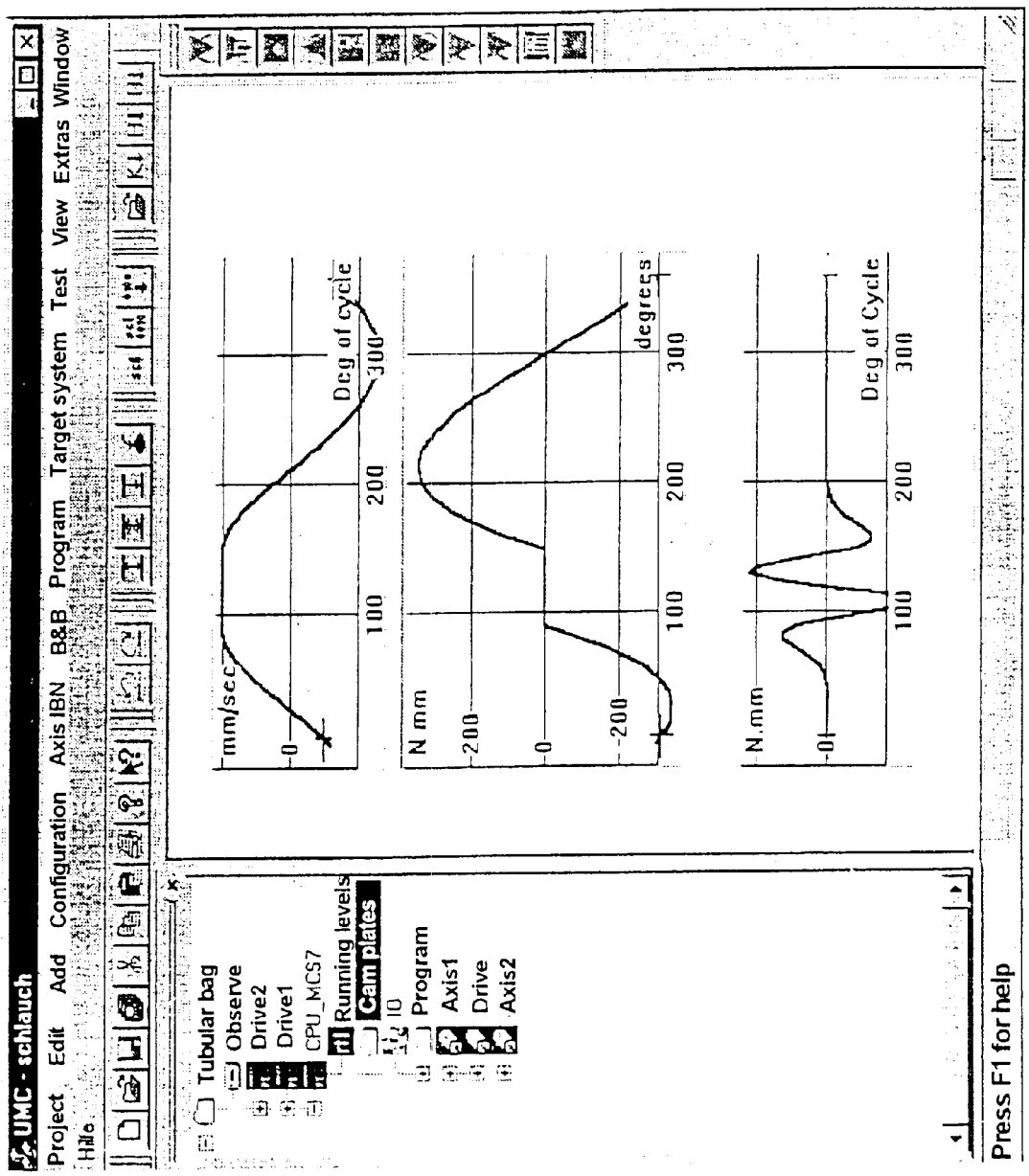
FIG. 11 shows a screenshot of a cam plate editor in the integrated controller.
Figure 12:
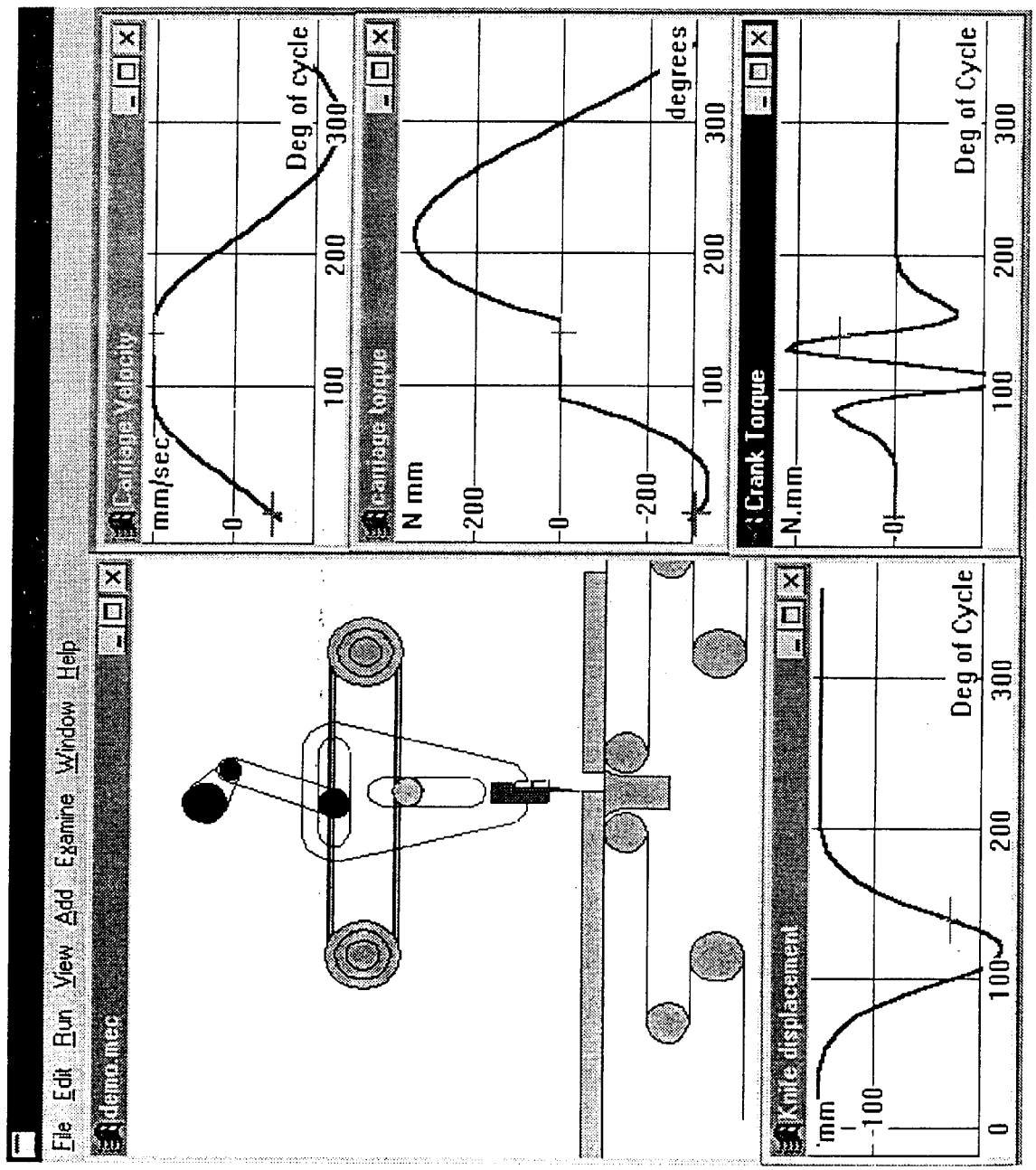
FIG. 12 shows a screenshot of a position-time chart editor in the integrated controller.
Figure 13:
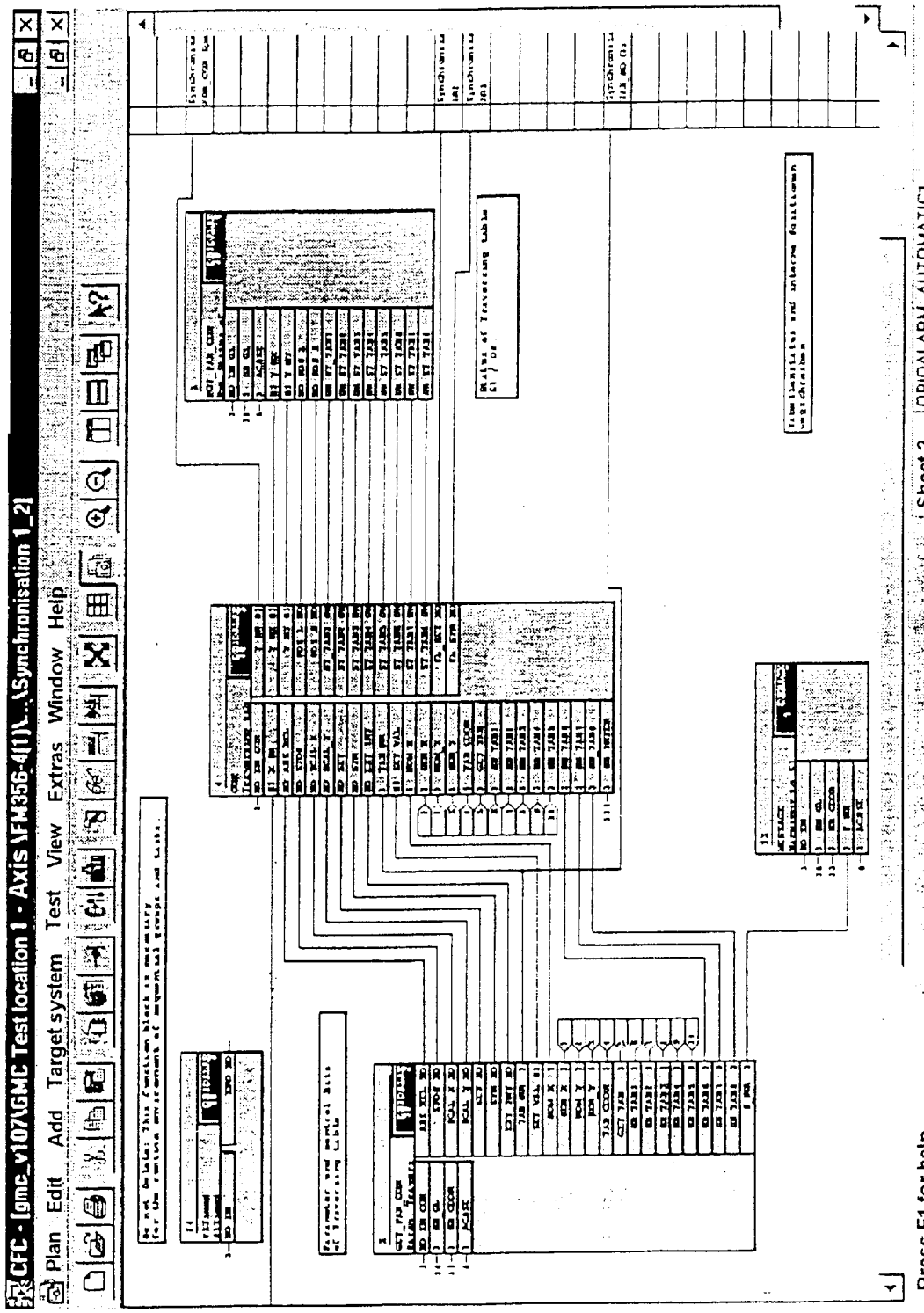
FIG. 13 shows a screenshot of a program editor in the integrated controller for programming with a data flow orientation (function control chart).
Figure 14:
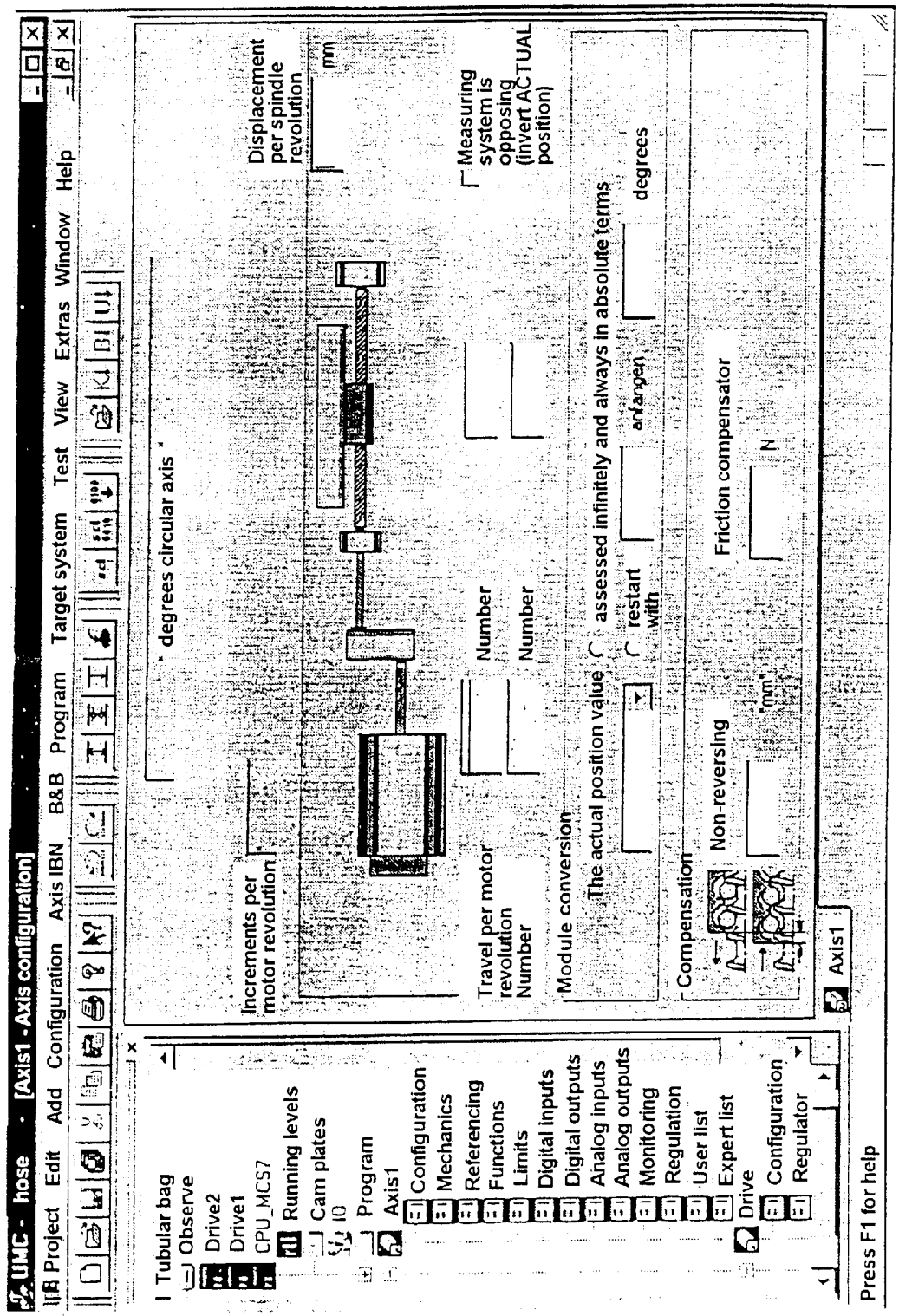
FIG. 14 shows a screenshot of a program tool for starting up the integrated controller.
Figure 15:
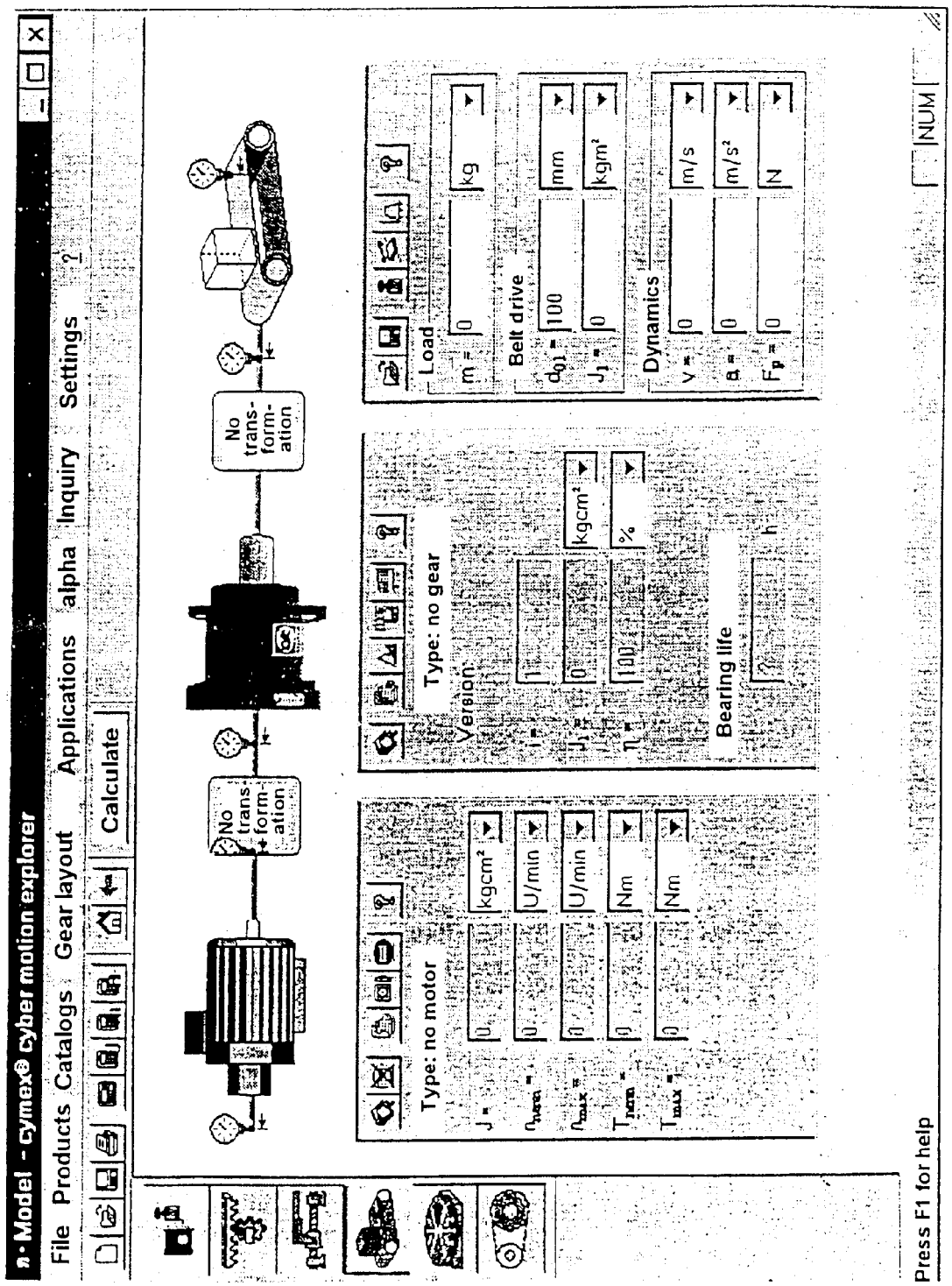
FIG. 15 shows a screenshot of a program tool for drive design in the integrated controller.

In FIG. 4, the symbol scheme of "drums" which are nested in one another and indicate datasets is used to show a dataset DB having an integrated data management unit DM and also current data DBIST and stored dataset changes ΔDB.

If changes are made to the respective source code data record SCD and/or to the engineering system data record $ES_D$ and/or to the parameterizing data record $P_D$ and/or to further data records, which are indicated here by three dots next to the parameterization data records $P_D$, these changes are recorded by the data management unit DM. Only the differences $\Delta SC_D$, $\Delta ES_D$ and $\Delta P_D$ associated with the respective data records $SC_D$, $ES_D$ and $P_D$ are stored in a data area ΔDB. In addition, the area for the dataset changes ΔDB can store, by way of example, user and/or system data ΔLOG or else other useful project data records. This is indicated in FIG. 4 in the area for the dataset change ΔDB by three dots next to the data record ΔLOG.

Taking an initial dataset as a basis, the present dataset is always held in the area of the current data DBIST by means of the data management unit DM. All the changes made are stored in documented form in the area ΔDB. When the integrated controller ICOMP is serviced, it is thus always possible to reconstruct all the system changes.

In FIG. 4, dataset changes to the source code $\Delta SC_D$ are stored as ΔSC1 and ΔSC2, dataset changes to the engineering system $\Delta ES_D$ are stored as ΔES1 and ΔES2, dataset changes to the parameterization system $\Delta P_D$ are stored as ΔP1 to ΔP3, and dataset changes to the system and/or user data ΔLOG are stored as ΔLOG1 to ΔLOG3.

In addition, in principle, the integrated data management unit DM can also record and store dataset changes ΔDB in their entirety. In this case, there is no need for splitting into individual data record changes.

An additional functional scope of the data management unit DM comprises the option of easily and rapidly restoring earlier data version states using the dataset changes. Particularly in the case of extensive but erroneous changes to the dataset DB, it is possible to fall back on an earlier version, and continued operation of the integrated controller ICOMP can be ensured. The erroneous change can be called in a later session on the engineering system $ICOMP_{ES}$, and the error search can be continued. This measure cleverly prevents the installation from being at a standstill for a relatively long period.

Figure 5:
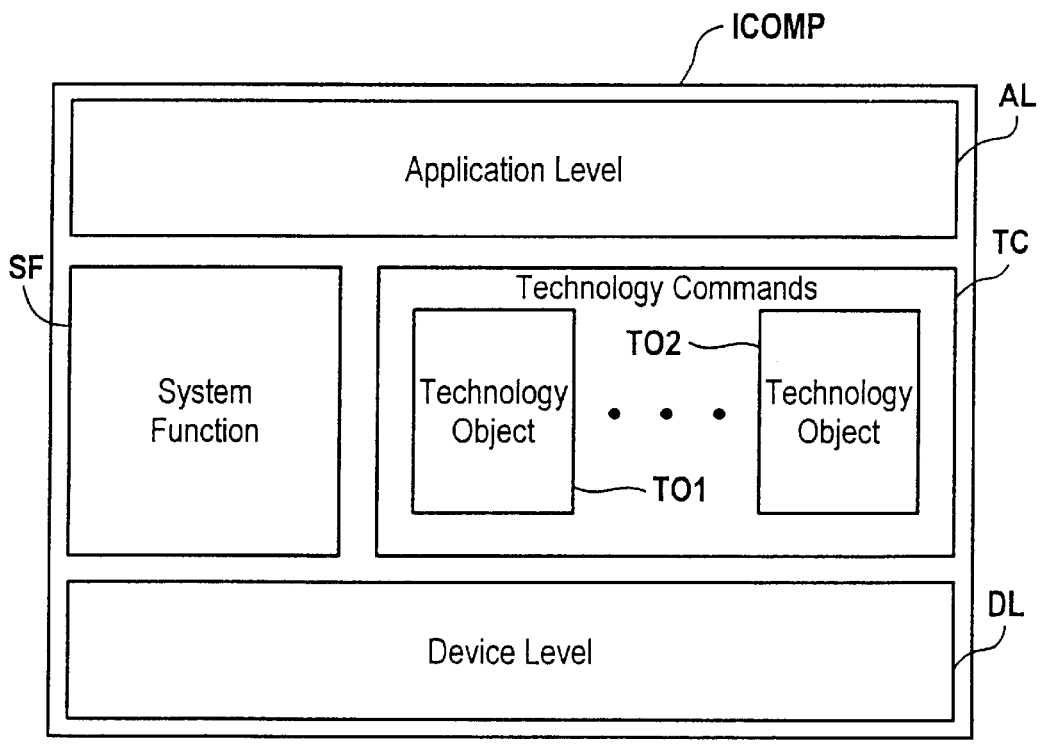
FIG. 5 shows the architectural design of the integrated controller.

FIG. 5 shows, schematically, the architectural design of the integrated controller ICOMP. An application level AL of integrated homogeneous design allows the user to fall back on system functions SF and/or technology commands TC. The technology commands TC are represented by technology objects TO1, TO2 which can be programmed flexibly and in fine steps and can be addressed and instantiated in an object oriented fashion. Further technology objects (not shown in FIG. 5) are indicated by three dots between the technology objects TO1 and TO2. At the device level DL, the system functions SF and all the technology objects are implemented as hardware functions and are executed.

In particular, the illustration of technology commands TC in parallel with the system functions SF is intended to illustrate that the two can affect the device level. The design of the technology objects TO1, TO2 provides the flexibility which is useful to the user. The commands and functions provided previously in an inflexible manner by functional modules FB1–FB3 of the application level via a rigid interface thus provided only a limited command and function set.

The technology commands TC which can be programmed in fine steps in technology objects TO1 and TO2 are used for advantageously providing the greatest possible flexibility, which goes beyond the prescribed system functions SF.

The illustrations shown in FIG. 6 to FIG. 15 show significant engineering views (e.g. program editors) from the engineering environment $ICOMP_{ES}$ of the integrated controller in the form of screenshots. These serve to visualize the individual sub-components of the engineering system $ICOMP_{ES}$ and can be regarded as photographic views.

The characters and image sections shown in the screenshots can be regarded as an ergonomic user interface, and this therefore exhibits an illustrative overall design which is supported by the principles described further above. The control options are not discussed in any more detail since they are intuitively suggested to the user by the chosen window programming.

Finally, it should also be pointed out that any documentation of dataset changes ΔDB can usefully support quality guidelines. If the integrated controller ICOMP is used in an industrial production plant, user changes can be reconstructed at any time and, if appropriate, can be correlated to incorrect instances of production. Since the time and date can also be recorded, there is definitive stipulation of which goods in production are affected by the data change.

We claim:

1. An automation system comprising a drive controller component which regulates rotation speed and/or position, and at least one other component selected from the group consisting of a programmable logic controller which can be regulated as required, and a motion controller which regulates complex operations, said components being integrated to form an integrated controller, and wherein the integrated controller further comprises an integrated engineering system having integrated programmability with an integrated runtime system having associated source code for user programs and a common data management unit.

2. The automation system according to claim 1 wherein the data management unit is integrated in the engineering system.

3. The automation system according to claim 1 wherein the data management unit is integrated in the integrated controller.

4. The automation system according to claim 1, wherein technological objects are integrated in the integrated controller.

5. The automation system according to claim 1, wherein the integrated controller has a single processor which is provided for executing every functionality.

6. The automation system according to claim 1, wherein functionality for a human/machine interface is additionally stored in the integrated controller.

7. The automation system according to claim 1, wherein the integrated controller is equipped with an integrated web server functionality.

8. The automation system according to claim 1, wherein respective forms of technology specific to sectors of industry are provided for the functionality of at least one of the group of said components.

9. The automation system according to claim 1, wherein the engineering system is incorporated in the integrated controller.

10. The automation system according to claim 1, wherein the data management unit is able to use an initial data version to generate a respectively current data version continuously from documented dataset changes made in a respectively arbitrary manner.

11. The automation system according to claim 10, wherein a previous data version can be restored by feeding back the documented dataset changes.

12. The automation system according to claim 1, wherein a single control action is used to load a cohesive project data configuration into the integrated controller, said configuration being able to contain at least one from the group consisting of parameterizing data, user program data, a hardware configuration, a bus configuration and an executable script or macro.

\* \* \* \* \*